US008616439B1

(12) United States Patent  (10) Patent No.: US 8,616,439 B1
Azen et al.  (45) Date of Patent: Dec. 31, 2013

(54) SYSTEM AND METHOD FOR THE SECURE TRANSFER OF INFORMATION TO A WEB SESSION

(71) Applicant: QUALCOMM Incorporated, San Diego, CA (US)

(72) Inventors: Jon S. Azen, San Diego, CA (US); Scott P. Monahan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/633,286

(22) Filed: Oct. 2, 2012

Related U.S. Application Data

(60) Provisional application No. 61/683,832, filed on Aug. 16, 2012.

(51) Int. Cl.
*G06F 17/00* (2006.01)
(52) U.S. Cl.
USPC .......................................................... 235/375
(58) Field of Classification Search
USPC ........................................ 235/462.01–462.49
See application file for complete search history.

(56) References Cited

U.S. PATENT DOCUMENTS

| 8,016,187 | B2 |   | 9/2011 | Frantz et al. |         |
|-----------|----|---|--------|---------------|---------|
| 8,418,920 | B2 | * | 4/2013 | Lieberman et al. | 235/383 |
| 2012/0078782 | A1 |   | 3/2012 | Schoenberg et al. |   |
| 2012/0143759 | A1 |   | 6/2012 | Ritorto, Jr. et al. |   |
| 2013/0198598 | A1 | * | 8/2013 | Kirsch | 715/226 |
| 2013/0219323 | A1 | * | 8/2013 | Kalu et al. | 715/780 |

FOREIGN PATENT DOCUMENTS

| CN | 102222294 A | 10/2011 |
| JP | 2002183476 A | 6/2002 |

* cited by examiner

*Primary Examiner* — Christle Marshall
(74) *Attorney, Agent, or Firm* — Nicholas A. Cole

(57) ABSTRACT

A system and method includes displaying a prompt on a display device of a first computing device to input information for an e-commerce session. Next, a selection for completing the e-commerce session by an information transfer is received. A machine-readable code that captures data corresponding to the e-commerce session, such as a web session identifier, is generated by the first computing device. The machine-readable code is made available for scanning by the first computing device. A message derived from the machine-readable and produced by a second computing device that scans the machine-readable code is received over a computer network. In response to receiving the message derived from the machine-readable code, information is transferred from a secure server to the e-commerce session. Before any information is transferred from the secure server to the e-commerce session, a prompt may be displayed on the second computing device requesting authorization for the transfer.

40 Claims, 9 Drawing Sheets

Welcome to our data transfer screen!

We need the following information to complete our web-session:

Name (First, Last) :

Street Address:

City:   State/Country:   zipcode:

Telephone number (XXX-XXX-XXX-XXXX):

Payment Info:

Credit Number:   Expiration Date (MM/YY):

Social Security Number:

Last Visit to Primary Care Physician (MM/DD/YYYY):

Would you like to use the AUTO-POP data transfer option with your mobile phone?   YES – I WANT TO USE THE AUTO-POP FEATURE

Welcome to our data transfer screen!

We need the following information to complete our web-session:

Name (First, Last) : JANE DOE

Street Address: 222 DEER LAKE LANE

City: DEARBORNE  State/Country: MI  zipcode: 12345

Telephone number (XXX-XXX-XXX-XXXX): 011-123-456-7890

Payment Info:

Credit Number: 9876 5432 1234 5678  Expiration Date (MM/YY): 12/13

Social Security Number: 123-45-6789

Last Visit to Primary Care Physician (MM/DD/YYYY): 03/24/2012

IS THIS DATA CORRECT?

YES – PLEASE TRANFER! (155A)   NO - CANCEL (155B)

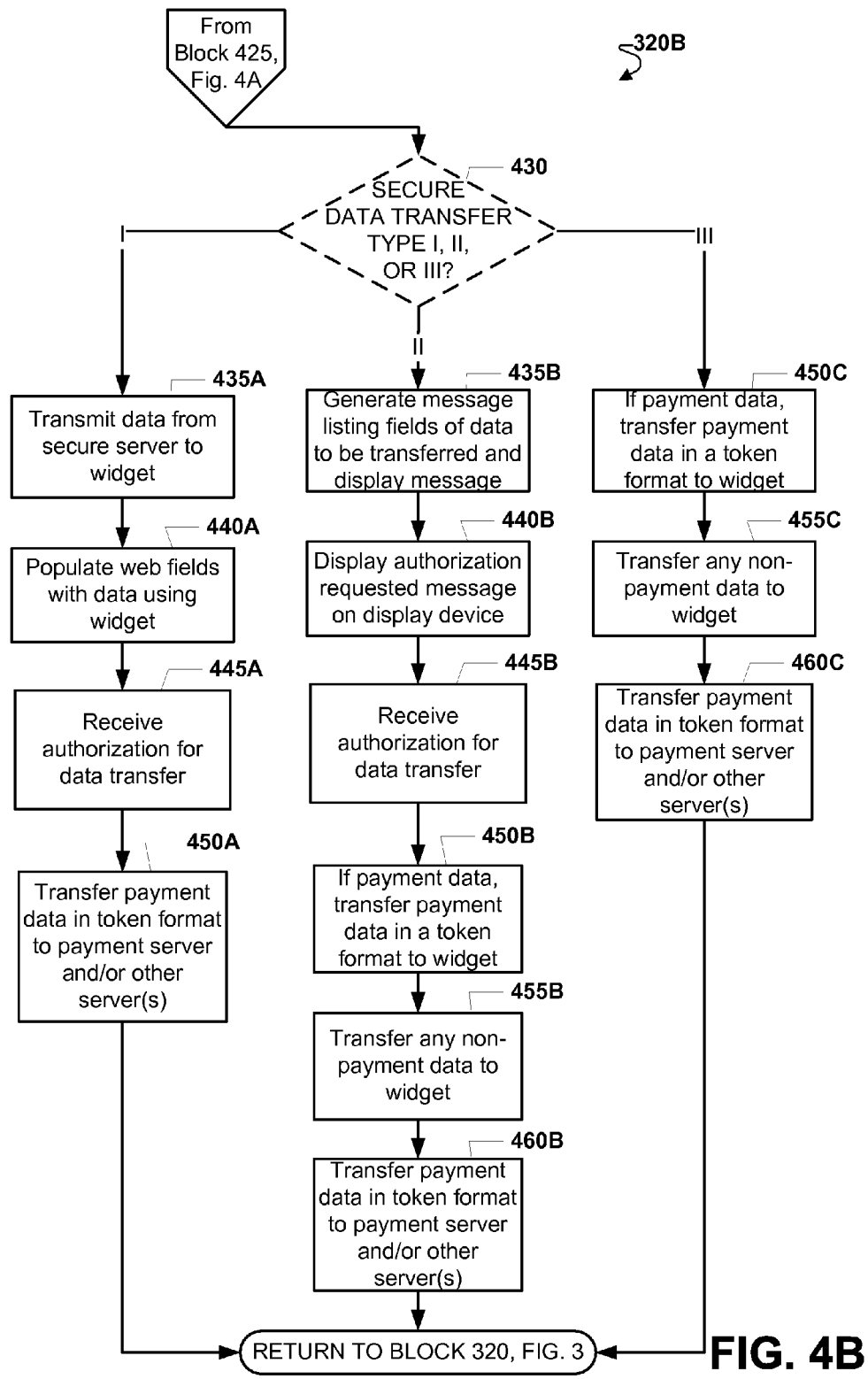

SYSTEM AND METHOD FOR THE SECURE TRANSFER OF INFORMATION TO A WEB SESSION

PRIORITY AND RELATED APPLICATIONS STATEMENT

This application claims priority under 35 U.S.C. §119(e) to U.S. Provisional Patent Application Ser. No. 61/683,832, entitled, "SYSTEM AND METHOD FOR THE SECURE TRANSFER OF INFORMATION TO A WEB SESSION," filed on Aug. 16, 2012. The entire contents of this provisional application are hereby incorporated by reference.

DESCRIPTION OF THE RELATED ART

Today, many Internet websites request numerous fields of data from people that may be relevant for a website session. For example, in an online transaction context, an Internet website of a merchant selling goods will usually request that the consumer provide detailed payment information that may include a credit card number, a billing address associated with the credit card number, and an expiration date for the credit card.

In another example, healthcare websites may request personal and/or private information such as a Social Security number, names of healthcare providers, addresses of these providers, facts relating to a person's medical history, and other similar data. Keying-in such data is often voluminous, tiresome, and repetitive. Further, requiring a person to key-in fields of data relevant to the website session is always susceptible to human generated errors.

Accordingly, what is needed in the art is a method and system for transferring information from an operator to a website server that is secure and which does not require the operator to manually key-in all of the information.

SUMMARY OF THE DISCLOSURE

According to one exemplary aspect of the system and method, a prompt is displayed on a display device of a first computing device to input information in an e-commerce session. Next, a selection for completing the e-commerce session by an information transfer is received. A machine-readable code that captures data corresponding to the e-commerce session, such as a web session identifier, is generated by the first computing device. The machine-readable code is displayed on a display device of the first computing device. A message derived from the machine-readable and produced by a second computing device is received over a computer network. In response to receiving the message derived from the machine-readable code, information is transferred from a secure server to the e-commerce session. The machine-readable code may include a bar code. The bar code may be a one-dimensional bar code or a two-dimensional bar code. Before any information is transferred from the secure server to the e-commerce session, a prompt may be displayed on the second computing device requesting authorization for the transfer of the information to the web session.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 1B is a diagram of a screen display of a non-pocket-sized portable computing device for entering data into various fields of a Web session and which comprises a mechanism for initiating an auto population feature;

FIG. 1F is a diagram of a screen display of a non-pocket-sized portable computing device corresponding to the screen display of FIG. 1B in which the various fields of the Web session have been populated with data sent from the secure data server;

FIG. 4B is a continuation flowchart of the sub-method or routine illustrated in FIG. 4A and which corresponds to the method of FIG. 3.

DETAILED DESCRIPTION

Figure 1A:
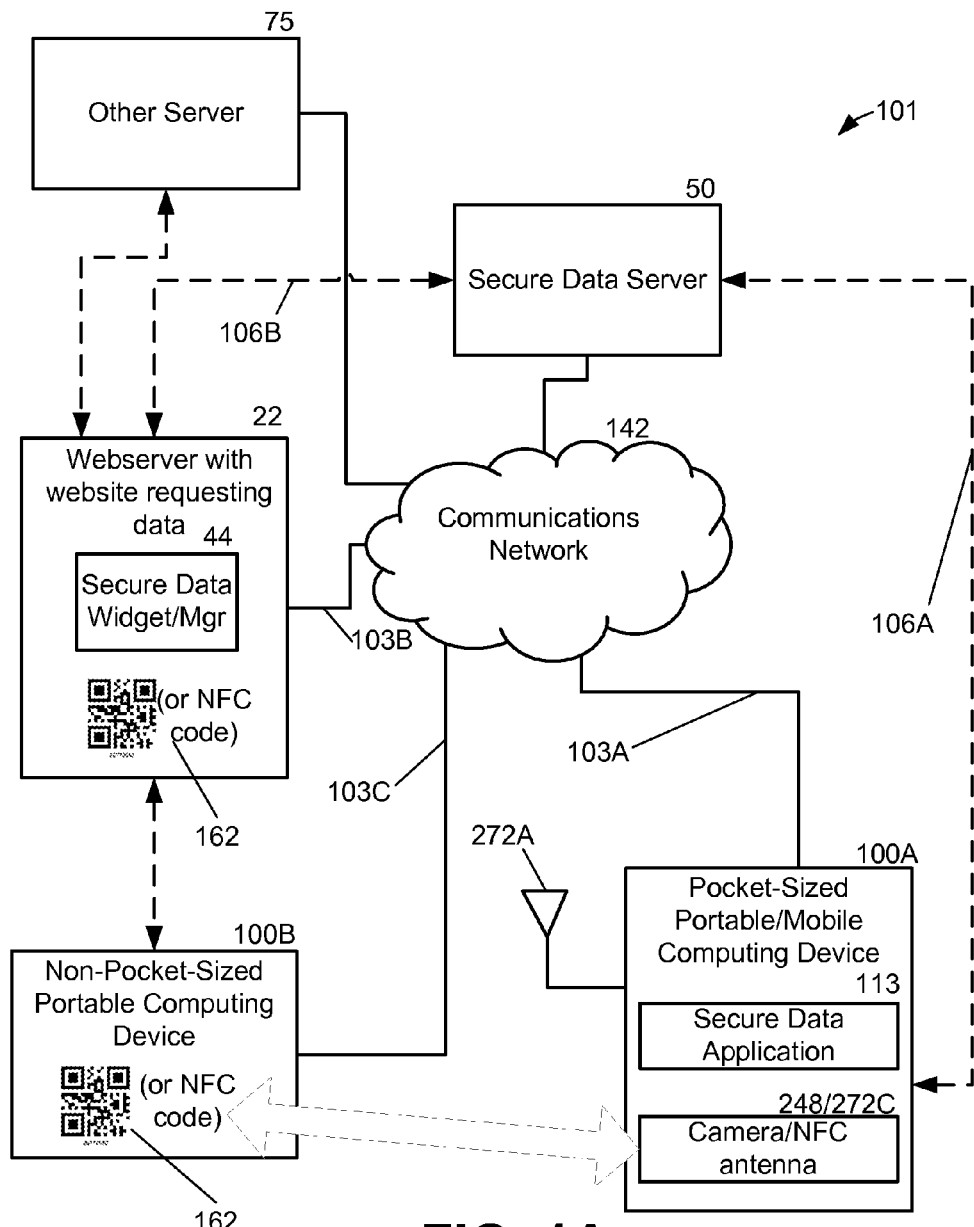
FIG. 1A is a diagram of a wireless, pocket-sized portable computing device (PCD) and a non-pocket-sized PCD coupled to a wireless communications network which are integral parts of a system for secure transfer of information during a Web session.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities.

A "pocket-sized portable computing device" ("PSPCD") may include a cellular telephone, a pager, a PDA, a smartphone, a navigation device, or a hand-held, palm-sized computer with a wireless connection or link. Meanwhile, a "non-pocket-sized portable computing device" ("NPSPCD") may include those devices which are typically larger than the "pocket-sized" PCDs described above and which usually have display devices that are larger than those found in pocket-sized PCDs. For example, a non-pocket-sized PCD may include a tablet PC, an iPAD, a laptop computer, a notebook computer, and the like in which operators are generally accustomed to keying-in data in support of a Web session.

However, the inventive system 101 as illustrated in FIG. 1A is not limited to a pocket-sized PCD 100A and a non-pocket-sized PCD 100A. The PCDs 100 may comprise hardware embodiments of equal size. The first PCD 100A may be associated or affiliated with the secure data server 50 while the second PCD 100B is not associated or affiliated with the secure data server 50. In such a scenario or exemplary embodiment, the first PCD 100A may authorize the transfer of the secure data stored on the secure data server 50 to the second PCD 100B which is not affiliated or associated with the secure data server 50.

FIG. 1A is a diagram of a wireless, pocket-sized portable computing device (PCD) 100A and a non-pocket-sized PCD 100B coupled to a wireless communications network 142 which are integral parts of a system 101 for secure transfer of information during a Web session. Many of the system elements illustrated in FIG. 1 are coupled via communication links 103 to the communications network 142.

The communication links 103 illustrated in FIG. 1 may comprise wired or wireless links. Wireless links include, but are not limited to, radio-frequency ("RF") links, infrared links, acoustic links, and other wireless mediums. The communications network 142 may comprise a wide area network ("WAN"), a local area network ("LAN"), the Internet, a Public Switched Telephony Network ("PSTN"), a paging network, or a combination thereof. FIG. 1A also illustrates direct virtual links 106 between elements of the system 101 which have been highlighted with dashed lines. These virtual links 106 emphasize how information may be transferred among elements of the system 101 but will usually be supported/established by the communication links 103 and the communications network 142.

The communications network 142 may be established by broadcast RF transceiver towers (not illustrated). However, one of ordinary skill in the art recognizes that other types of communication devices besides broadcast RF transceiver towers are included within the scope of this disclosure for establishing the communications network 142.

The pocket-sized PCD 100A is shown to have a RF antenna 272A so that it may establish a wireless communication link 103A with the communications network 142 via RF transceiver towers (not illustrated). The pocket-sized portable computing device ("PCD") 100A may support a secure data application 113 that may reside in memory 203 (See FIG. 2) of the PCD 100A.

The secure data application 113 may allow the pocket-sized PCD 100A to communicate with the secure data server 50 over the communications network 142. The secure data application 113 may also allow the pocket-sized PCD 100 to collect and relay information from a machine-readable code 162 produced by the secure data widget/manager 44 running on the web server 22.

The machine-readable code 162 may comprise a unique web-session identifier that corresponds to a web-session running on the web server 22. The web server 22 may comprise a secure data widget/manager 44 which is responsible for generating the session specific machine-readable code 162 that may be scanned by the pocket-sized PCD 100A (with its camera 248) when the code 162 is displayed on display device of the non-pocket-sized PCD 100B. Further details about the secure data widget/manager 44 will be described below in connection with FIGS. 3-4.

When the pocket-sized PCD 100A scans the machine-readable code 162 with its camera 248, the pocket-sized PCD 100A may relay the web-session identifier derived from the machine-readable code 162. This web-session identifier may be relayed from the pocket-sized PCD 100A over a secure, wireless communication channel/link 103A to the secure data server 50.

Upon receiving the web-session identifier from the pocket-sized PCD 100A and a query from the web server 22, the secure data server 50 may relay personal/confidential information about the operator of the pocket-sized PCD 100A from its database to the web server 22, and specifically to the secure data widget/manager 44, for autopopulating fields of data in the web session running on the web server 22. The secure data widget/manager 44 may, in turn, and at its option/discretion, may relay portions and/or all of the information it received to another server 75, such as to a payment server in a payment transaction scenario.

FIG. 1B is a diagram of a screen display 150A of a non-pocket-sized portable computing device 100B for entering data into various fields 120 of a Web session and which comprises a mechanism 160 for initiating an auto population feature. As the noted previously, one objective of the system 101 is to securely transfer any type of data from the secure data server 52 any type of Web server 22 that requires information usually acquired through fields 120 for entering data.

The system 101 may allow the transfer of various type of personal and confidential information such as, but not limited to, payment information that can include credit card numbers, bank account numbers, billing addresses, and other similar payment information; health record data that may include medical history, Social Security numbers, patient medical records, names and contact information for physicians, and other similar health record data; and information relating to school records as well as sport records for team sports registrations etc. The system 101 may hold any type of information secure within the secure data server 50 and which can be released and transferred upon receiving authorization from the pocket-sized portable computing device 100A in conjunction with the machine-readable code 162 or an equivalent thereof as will be described below.

In the exemplary embodiment illustrated in FIG. 1B, the data fields 120 include a field 120 for an operator's first and last name, street address, city, state/country, zip code, telephone number, credit card number, credit card expiration date, Social Security number, and a date for the last visit of the operator's primary care physician. However, the system 101 is not limited to these fields 120 as illustrated in FIG. 1B. Other types of fields 120 are possible and are within the scope of this disclosure as understood by one of ordinary skill the art. Further, fewer or a greater number of fields 120 may be employed without departing from the scope of this disclosure.

The mechanism 160 for initiating the auto population feature for automatically populating the fields 120 with secure data retrieved from the secure data server 50 comprises an on-screen button that is part of a graphical user interface. The system 101 may employ other types of mechanisms 160 such as a drop-down menu, radio type buttons, and other similar graphical user interface elements as understood by one of ordinary skill in the art.

Upon selection of the mechanism 160 with a screen pointer (not illustrated), the secure data widget/manager 44 running on the Web server 22 may be initiated. Further details of the secure data widget/manager 44 running on the Web server 22 will be described below in connection with FIGS. 3-4. As illustrated in the exemplary embodiment of FIG. 1B, the mechanism 160 may include a text to describe what this graphical element will initiate once it is selected. The text in FIG. 1B for mechanism 160 states, "YES, I WANT TO USE THE AUTO-POP FEATURE." However, other text and/or graphical elements may be employed without departing from the scope of this disclosure. In response to selecting the mechanism 160, the secure data widget/manager 44 may produce the message illustrated in FIG. 1C described below.

Figure 1C:
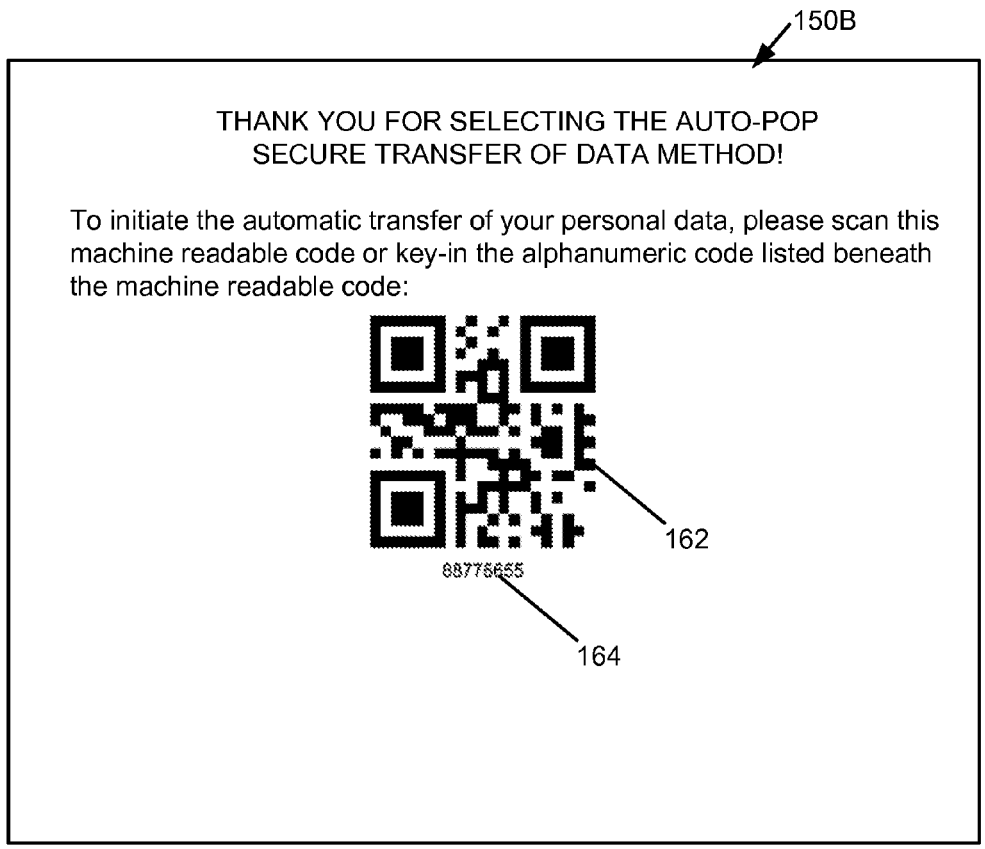
FIG. 1C is a diagram of a screen display of a non-pocket-sized portable computing device that comprises a machine-readable code for scanning by a pocket-sized portable computing device.

FIG. 1C is a diagram of a screen display 150B of a non-pocket-sized portable computing device 100B that comprises a machine-readable code 162 for scanning by a pocket-sized portable computing device 100A. In the exemplary embodiment illustrated in FIG. 1C, the machine-readable code comprises a two-dimensional barcode.

The 2-D bar code 162 may include, but is not limited to, the following symbologies: Aztec Code, 3-DI, ArrayTag, Small Aztec Code, Chromatic Alphabet, Chromocode, Codablock, Code 1, Code 16K, Code 49, ColorCode, Compact Matrix Code, CP Code, CyberCode, d-touch, DataGlyphs, Datamatrix, Datastrip Code, Dot Code A, EZcode, Grid Matrix Code, High Capacity Color Bar code, HueCode, INTACTA.CODE, InterCode, MaxiCode, mCode, MiniCode, Micro PDF417, MMCC, Nintendo e-Reader#Dot code, Optar, PaperDisk, PDF417, PDMark, QR Code, QuickMark Code, Semacode, SmartCode, Snowflake Code, ShotCode, SuperCode, Trillcode, UltraCode, UnisCode, VeriCode, VSCode, Water-Code, for example.

However, the system 101 is not limited to two-dimensional machine-readable bar codes 162. The system may employ one-dimensional bar codes which include, but are not limited to, U.P.C., Codabar, Code 25—Non-interleaved 2 of 5, Code 25—Interleaved 2 of 5, Code 39, Code 93, Code 128, Code 128A, Code 128B, Code 128C, Code 11, CPC Binary, DUN 14, EAN 2, EAN 5, EAN 8, EAN 13, Facing Identification Mark, GS1-128 (formerly known as UCC/EAN-128), GS1 DataBar formerly Reduced Space Symbology ("RSS"), HIBC (HIBCC Bar Code Standard), ITF-14, Latent image bar code, Pharmacode, Plessey, PLANET, POSTNET, Intelligent Mail Bar code, MSI, PostBar, RM4SCC/KIX, JAN, Telepen, for example.

As an alternative to an optical machine-readable code, the pocket-sized portable computing device 100A may receive the machine-readable code through a wireless channel if the non-pocket sized portable computing device 100B is so equipped with a wireless transmitter and antenna, such as a Near Field Communication ("NFC") antenna. As described below, the pocket-sized portable computing device 100A is equipped with an NFC antenna 272C.

In addition to, and in some cases, in the alternative to the machine-readable code 162, a human readable code 164 may be displayed on the display device. In this way, if the pocket-sized portable computing device 100A is unable to scan the machine-readable code 162, then the operator of the pocket-sized portable computing device 100A may be able to key in the characters of the human readable code 164 instead of scanning the machine-readable code 162.

Figure 1D:
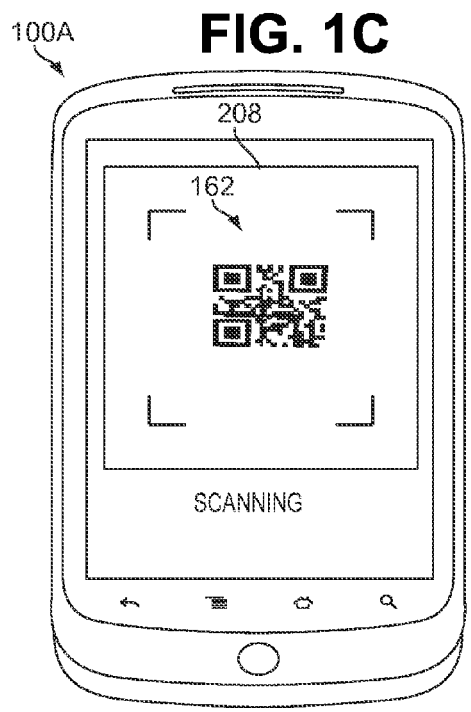
FIG. 1D is a diagram of a screen display of a pocket-sized portable computing device that comprises a visual scan of the machine-readable code illustrated in FIG. 1C.

FIG. 1D is a diagram of a screen display 208 of a pocket-sized portable computing device 100A that comprises a visual scan of the machine-readable code 162 illustrated in FIG. 1C. The screen display 208 may be generated by the secure data application 113 which is executed by the pocket-sized portable computing device 100A. The secure data application 113 may be responsible for controlling the camera 248 (see FIG. 2) in order to conduct the scan of the machine-readable code 162. The secure data application 113 may also decipher the machine-readable code 162 and extract the web session ID that is embedded in the code 162. Other information besides the web session ID may be embedded in the code 162 as understood by one of ordinary skill the art. The secure data application 113 may also transmit the web session ID back to the secure data server 50 as will be described in further detail below.

As mentioned previously, if the secure data application 113 and/or the pocket-sized portable computing device 100A cannot scan the machine-readable code 162 correctly, then the secure data application 113 may prompt the operator to enter the human readable code 164 as illustrated in FIG. 1C. Upon receiving the data entry corresponding to the human readable code 164, the secure data application 113 may extract the web session ID and transmit it to the secure data server 50 as noted above.

Figure 1E:
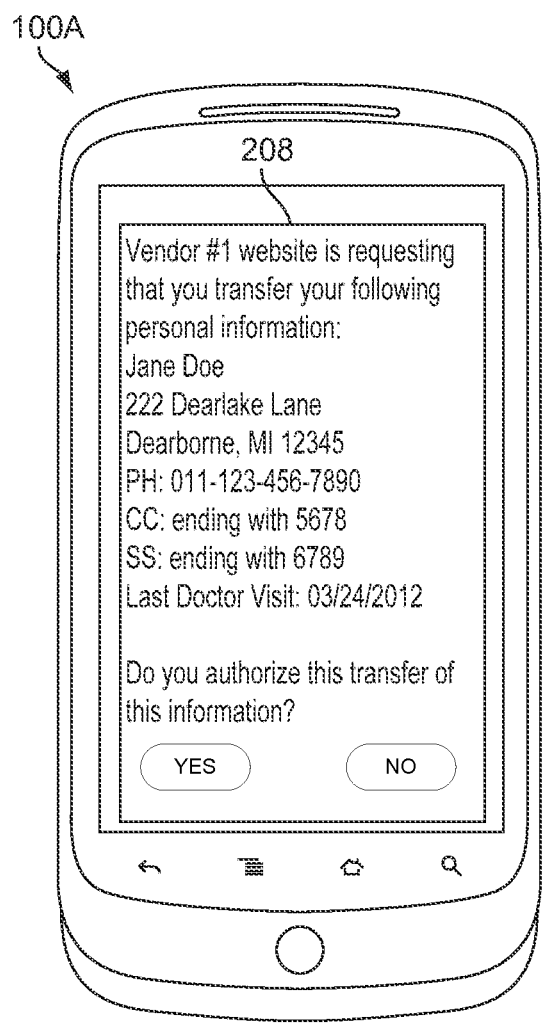
FIG. 1E is a diagram of a screen display of a pocket-sized portable computing device that includes a prompt for the operator to authorize the fields of data which may be transferred from the secure data server to the server supporting the Web session on the non-pocket-sized portable computing device.

FIG. 1E is a diagram of a screen display 208 of a pocket-sized portable computing device 100A that includes a prompt for the operator to authorize the fields of data which may be transferred from the secure data server 50 to the server 22 supporting the Web session on the non-pocket-sized portable computing device 100B. This screen display 208 is optional and it may be provided as an additional security feature to the system 101.

In the exemplary embodiment illustrated in FIG. 1E, the prompt comprises a text which states that, "VENDOR #1 WEBSITE IS REQUESTING THAT YOU TRANSFER YOUR FOLLOWING PERSONAL INFORMATION: . . . " And then the text lists the information which is about to be transferred to the website of the web session supported by the Web server 22. This listing of information is usually abbreviated since the screen display 208 of the pocket-sized portable computing device 100A is typically relatively smaller than the display of the non-pocket-sized portable computing device 100B. However, as noted above, the system 101 is not limited to pocket-sized and non-pocket-sized portable computing devices 100A, B. It is envisioned that the two portable computing devices 100 could be of equal sized hardware in other exemplary embodiments. In such exemplary embodiments where the two portable computing devices 100 are of equal size, then it is possible for the portable computing device 100 associated with the secure data server 50 display a full and complete listing of the information which is about to be transferred to the portable computing device 100 which is not associated with the secure data server 50.

If the operator of the pocket-sized portable computing device 100A agrees to transfer the personal information from the secure data server 52 the Web server 22, then the operator may select a "YES" response to the question of whether the operator authorizes the transfer of this information. If the operator of the pocket-sized portable computing device 100A does not wish to transfer the personal information, then the operator may select a "NO" response to the question of whether the operator authorizes the transfer of this information.

FIG. 1F is a diagram of a screen display 150C of a non-pocket-sized portable computing device 100B corresponding to the screen display 150A of FIG. 1B in which the various fields 120 of the Web session have been populated with data sent from the secure data server 50. In this exemplary embodiment, the following fields 120 were populated by the secure data widget/manager 44 residing within the Web server 22: an operator's first and last name, street address, city, state/country, zip code, telephone number, credit card number, credit card expiration date, Social Security number, and a date for the last visit of the operator's primary care physician.

This screen display 150C is also optional. In other words, in some exemplary embodiments described below do not display the various fields 120 of the web session with the information that has been transferred from the secure server 50. In the exemplary embodiment illustrated in FIG. 1F, the screen display 150A has a further additional and optional prompt which requests the operator to confirm that the data displayed in the fields 120 is correct. The operator may select either a "YES" response 155A to complete the information transfer or a "NO" response to stop the information transfer.

However, it is noted that at this stage in some exemplary embodiments, the personal and/or confidential information received from the secure data server 50 may have already occurred since the secure data widget/manager 44 has populated the various fields 120 of the web session which is being executed by the Web server 22. In response to a "NO" or a negative response from the operator to cancel the transfer of information, the secure data widget/manager 44 may erase the information which was transferred from the secure data server 50 and which was placed in any data store and/or database and for populating the fields 120.

Figure 2:
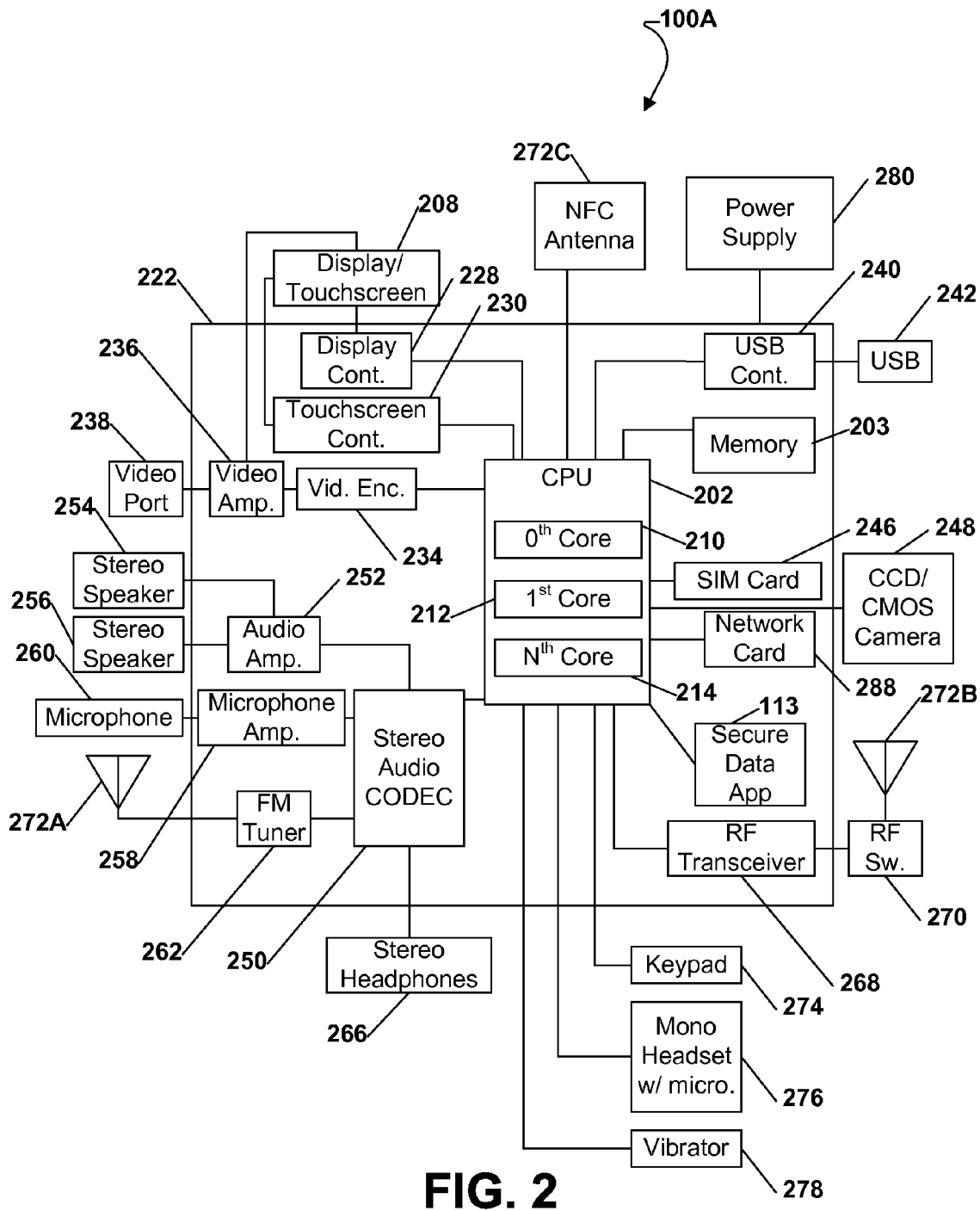
FIG. 2 is a functional block diagram illustrating an exemplary pocket-sized portable computing device.

Referring to FIG. 2, an exemplary, non-limiting aspect of a pocket-sized portable computing device ("PCD") is shown and is generally designated 100A. The non-pocket-sized portable computing device 100B as illustrated in FIG. 1A may have similar or identical components as described below and contained in the pocket-sized portable computing device 100A as understood by one of ordinary skill in the art.

As shown, the pocket-sized PCD 100A includes an on-chip system 222 that includes a multicore CPU 202. The multicore CPU 202 may include a zeroth core 210, a first core 212, and an Nth core 214.

As illustrated in FIG. 2, a display controller 228 and a touch screen controller 230 are coupled to the multicore CPU 202. In turn, a display 208 external to the on-chip system 222 is coupled to the display controller 228 and the touch screen controller 230. An NFC antenna 272A may be coupled to the CPU 202 and may support functions that work in combination with a secure data application module 113. The secure data application module 113 may comprise software and/or hardware and/or firmware as understood by one of ordinary skill in the art.

FIG. 2 further shows that a video encoder 234, e.g., a phase alternating line ("PAL") encoder, a sequential color a memoire ("SECAM") encoder, or a national television system(s) committee "(NTSC") encoder, is coupled to the multicore CPU 202. Further, a video amplifier 236 is coupled to the video encoder 234 and the touch screen display 208. Also, a video port 238 is coupled to the video amplifier 236. As shown in FIG. 2, a universal serial bus ("USB") controller 240 is coupled to the multicore CPU 202. Also, a USB port 242 is coupled to the USB controller 240. Memory 203 and a subscriber identity module ("SIM") card 246 may also be coupled to the multicore CPU 202.

Further, as shown in FIG. 2, a camera 248 may be coupled to the multicore CPU 202. In an exemplary aspect, the camera 248 is a charge-coupled device ("CCD") camera or a complementary metal-oxide semiconductor ("CMOS") camera.

As further illustrated in FIG. 2, a stereo audio coder-decoder ("CODEC") 250 may be coupled to the multicore CPU 202. Moreover, an audio amplifier 252 may coupled to the stereo audio CODEC 250. In an exemplary aspect, a first stereo speaker 254 and a second stereo speaker 256 are coupled to the audio amplifier 252. FIG. 2 shows that a microphone amplifier 258 may be also coupled to the stereo audio CODEC 250. Additionally, a microphone 260 may be coupled to the microphone amplifier 258. In a particular aspect, a frequency modulation ("FM") radio tuner 262 may be coupled to the stereo audio CODEC 250. Also, an FM antenna 272A is coupled to the FM radio tuner 262. Further, stereo headphones 266 may be coupled to the stereo audio CODEC 250.

FIG. 2 further illustrates that a radio frequency (RF) transceiver 268 may be coupled to the multicore CPU 202. An RF switch 270 may be coupled to the RF transceiver 268 and an RF antenna 272B. As shown in FIG. 2, a keypad 274 may be coupled to the multicore CPU 202. Also, a mono headset with a microphone 276 may be coupled to the multicore CPU 202. Further, a vibrator device 278 may be coupled to the multicore CPU 202. FIG. 2 also shows that a power supply 280 may be coupled to the on-chip system 222. In a particular aspect, the power supply 280 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 2 further shows that the PCD 100 may also include a network card 288 that may be used to access a data network, e.g., a local area network, a personal area network, or any other network. The network card 288 may be a Bluetooth network card, a WiFi network card, a personal area network (PAN) card, a personal area network ultra-low-power technology (PeANUT) network card, or any other network card well known in the art. Further, the network card 288 may be incorporated into a chip, i.e., the network card 288 may be a full solution in a chip, and may not be a separate network card 288.

As depicted in FIG. 2, the display 208, the video port 238, the USB port 242, the camera 248, the first stereo speaker 254, the second stereo speaker 256, the microphone 260, the FM antenna 264, the stereo headphones 266, the RF switch 270, the RF antenna 272, the keypad 274, the mono headset 276, the vibrator device 278, and the power supply 280 are external to the on-chip system 222.

In a particular aspect, one or more of the method steps described herein may be stored in the memory 203 as well as in the secure server 50, both PCDs 100A, 100B, and web server 22, and other storage devices as computer program instructions. These instructions may be executed by the multicore CPU 202, secure server 50, and web server 22 that includes the secure data widget/manager 44 in order to perform the methods described herein. Further, the multicore CPU 202 of PCD 100, a CPU of PCD 100B, secure server 50, web server 22, including the secure data widget/manager 44, other storage devices, and memory 203 of the PCD 100A, 10B, or a combination thereof may serve as a means for executing one or more of the method steps described herein.

Figure 3:
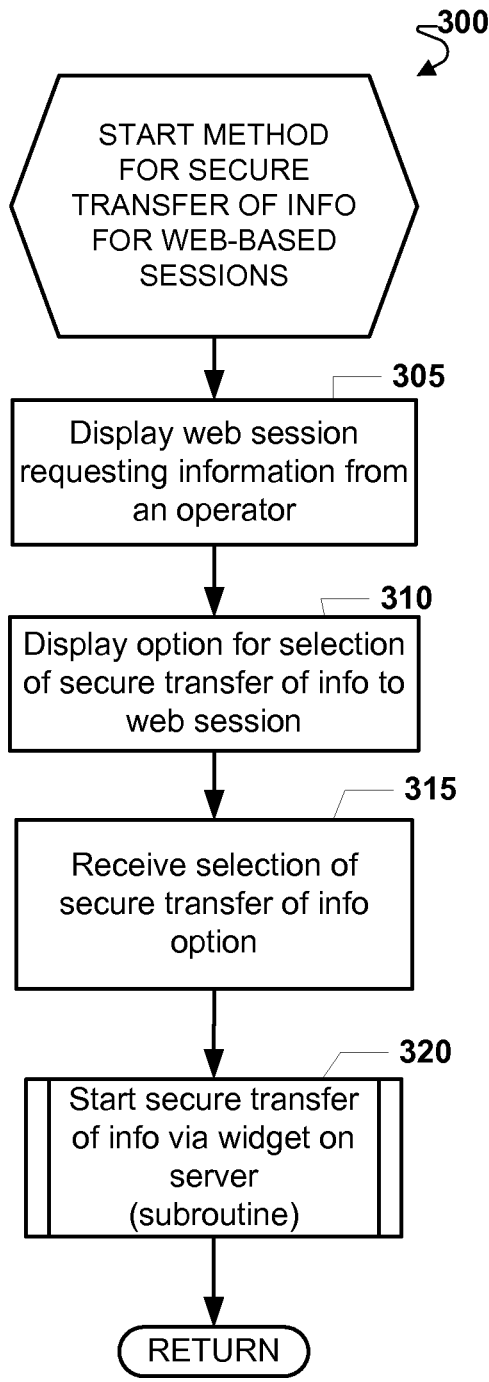
FIG. 3 is a flowchart illustrating a method for the secure transfer of information for web-based sessions according to one exemplary embodiment.

FIG. 3 is a flowchart illustrating a method 300 for the secure transfer of information for web-based sessions according to one exemplary embodiment. Block 305 is the first block of the exemplary method 300. In block 305, a Web session may be displayed on a display device, such as the screen display 150A as illustrated in FIG. 1B described above. The Web session may comprise fields 120 that are requesting information from an operator as understood by one of ordinary skill in the art.

Next, in block 310, an option for selecting the secure transfer of information to the Web session may be displayed on the display device. For example, text in combination with a graphical user interface, such as the screen button 160 as illustrated in FIG. 1B may be displayed to an operator and which may be selectable by the operator.

Subsequently, in block 315, a selection for the secure transfer of information may be received with the secure data widget/manager 44 that is executed by and/or as part of the Web server 22 which is running the Web session. This selection may comprise an operator using a screen pointer to select and/or activate the screen button 160 as illustrated in FIG. 1B.

Next, in routine or submethod block 320, the secure transfer of information from the secure data server 50 to the Web server 22 may be initiated. For example, in response to the reception of the selection described in block 315, the secure data widget/manager 44 being executed by the Web server 22 may be initiated. Further details of this routine/submethod block 320 will be described below in connection with FIGS. 4A-4B. After routine block 320, the process may then return back to block 305.

Figure 4A:
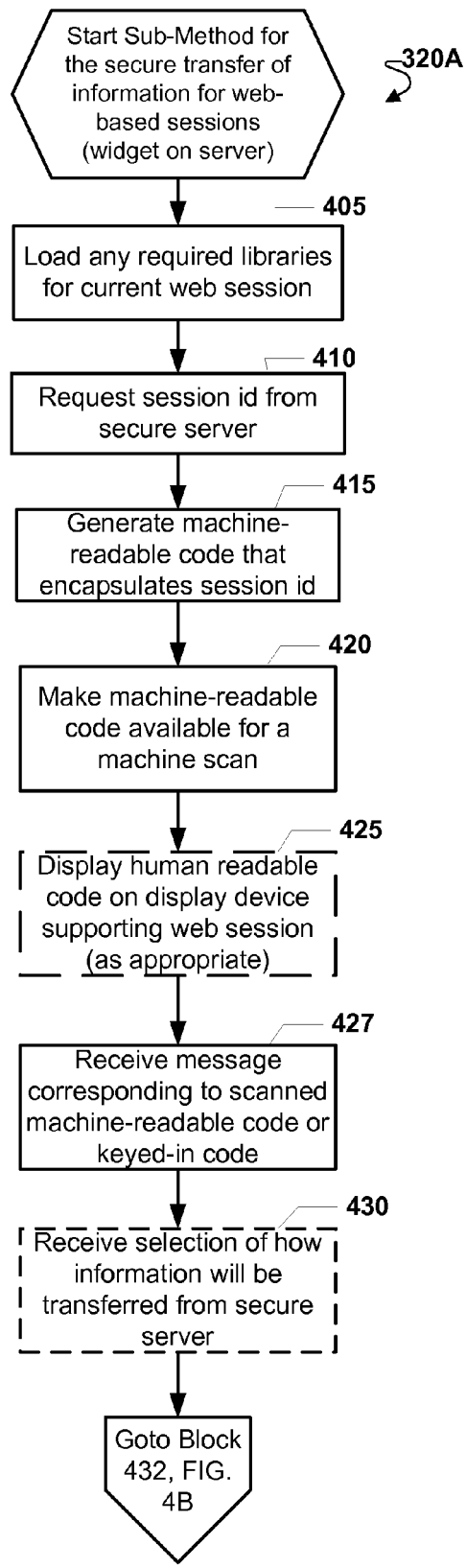
FIG. 4A is a flowchart illustrating a sub-method or routine corresponding to the method of FIG. 3.

FIG. 4A is a flowchart illustrating a sub-method or routine 320A corresponding to the method 300 of FIG. 3. Submethod 320 generally corresponds with the actions taken by the secure data widget/manager 44 once it is initialized by an operator who desires to securely transfer information from the secure data server 52 the Web server 22.

Block 405 is the first block of submethod 320A. In block 405, the secure data widget/manager 44 may load any required libraries for the current Web session that is being supported by the Web server 22. Next, in block 410, the secure data widget/manager 44 may request a Web session identifier from the secure server 50. In block 415, the secure data widget/manager 44 may generate a machine-readable code that encapsulates the Web session identifier received from the secure server 50.

In block 420, the secure data widget/manager 44 may display or transmit the machine-readable code that was generated in block 415. Block 420 generally corresponds with FIG. 1C in which the screen display 150B is generated in which the machine-readable code 162 is visible. In an alternate exemplary embodiment, the machine-readable code 162 may be transmitted in a wireless manner in addition to the optical-visible code 162 or in the alternative, such as by using an NFC communication as discussed above and as understood by one of ordinary skill in the art.

Next, in optional block 425, a human readable code 164 may be generated and displayed by the secure data widget/manager 44. As noted previously, the secure data widget/manager 44 may generate this backup, human readable code 164 so that an operator of the pocket-sized PCD 100A may enter/key-in the human readable code 164 if the pocket-sized PCD 100A is unable to correctly scan the machine-readable code 162. Optional block 425 has been illustrated with dashed lines to indicate that in some exemplary embodiments this block 425 may be skipped and/or completely dropped altogether.

In block 427, the secure web server 50 may receive a message comprising a scan of the machine-readable code and/or the digits keyed-in from block 425. This message is produced by the pocket-sized portable computing device 100A which may scan the machine readable code 162 that is presented on the display device of the non-pocket-sized portable computing device 100B.

Next, in optional block 430, a selection of how information will be transferred from the secure server 50 to the Web server 22 may be received. According to this exemplary block 430, the designer/programmer for the secure data widget/manager 44 may decide on what methods may be used for transferring personal and/or confidential information from the secure server 50 to the Web server 22. Specifically, there are at least three options as will be described below in connection with FIG. 4B in which data from the secure server 50 may be transferred to a Web server 22. This optional block 430 may not constitute an express or explicit step that is always practiced in method 300. This optional block 430 may merely articulate a design choice of a computer programmer for coding the secure data widget/manager 44 running on the Web server 22. Optional block 430 has been illustrated with dashed lines to indicate that in some exemplary embodiments this optional block 430 may be skipped and/or completely dropped altogether in those exemplary embodiments when only one option of the three options (described below) is coded.

A first option for transferring data between the secure server 50 and the Web server 22 may include a process in which the data being transferred is automatically populated within the field 120 as illustrated in FIG. 1F. This first option may generally correspond to blocks 435A-450A as will be described below in connection with FIG. 4B.

A second option for transferring data between the secure server 50 and the Web server 22 may include a process in which a prompt is generated before any data is transferred from the secure server 50 to the Web server 22. The second option may generally correspond to blocks 435B-460B as will be described below in connection with FIG. 4B. The second option may also generally correspond to the prompt which is displayed on the pocket-sized portable computing device 100A as illustrated in FIG. 1E. Under the second option, unlike the first option, the transferred data may not be displayed or auto populated in the fields 120 as illustrated in FIG. 1F.

A third option for transferring data between the secure server 50 and the Web server 22 may include a process in which there is no prompt generated like the second option and the information from the secure server 50 is immediately transferred to the Web server 22 without any auto population or displaying of the transferred data in the fields 120 as illustrated in FIG. 1F.

Each of these three options will be described below in further detail in connection with FIG. 4B. As noted previously, one of these three options may be selected by the computer programmer of the secure data widget/manager 44 at the time of coding. This means that in some exemplary embodiments only one of the three options illustrated in FIG. 4B may be present within the computer code. Alternatively, as understood by one of order skill the art, a computer programmer may also produce an exemplary embodiment in which an operator of the pocket-sized portable computing device 100A may be presented with a prompt such that he or she selects from one of the three secure data transfer methods mentioned above and which will be described in further detail in connection with FIG. 4B below.

FIG. 4B is a continuation flowchart of the sub-method or routine 320B illustrated in FIG. 4A and which corresponds to the method 300 of FIG. 3. This flowchart originates from block 430 of FIG. 4A. Optional decision block 432 is the first block of this continuation flowchart for the submethod or routine 320B.

Similar to the discussion above about optional block 430, this optional decision block 432 may or may not be present within the computer code that forms the secure data widget/manager 44 and which may be executed by the Web server 22. In other words, in some exemplary embodiments one of the three options corresponding to blocks 435A-450A, 435B-460B, or 450C-460C may be present within the computer code. In alternate exemplary embodiments, a computer programmer may also include all three parallel flows so that anyone of the three options may be selected by an operator of the pocket-sized portable computing device 100A. Optional decision block 432, like optional block 430, has been illustrated with dashed lines to indicate that in some exemplary embodiments this block 430 may be skipped and/or completely dropped altogether in those exemplary embodiments when only one option of the three options is coded.

Optional decision block 432 determines which one of the three data transfer types have been selected for transferring data from the secure data server 50 to the Web server 22. If the inquiry to optional decision block 432 is the first data transfer format, then the first data transfer format "I" branch is followed to block 435A. If the inquiry to optional decision block 432 is the second data transfer format, then the second data transfer format "II" branch is followed to block 435B. If the inquiry to optional decision block 432 is the third data transfer format, then the third data transfer format "III" branch is followed to block 450C.

Following the first data transfer "I" branch, in block 435A, the secure server 50 transfers its data to the secure data widget/manager 44 of the Web server 22. Next in block 440A, the secure data widget/manager 44 may populate the web fields 120 as illustrated in FIG. 1F. The secure data widget/manager 44 may comprise a mapping table that matches data fields received from the secure server 50 with the web fields 120 as illustrated in FIG. 1F. Such a mapping table is common and is understood by one of ordinary skill the art.

Next, in block 445A, the secure data widget/manager 44 may receive authorization for the transfer of this data to the website 22. This block 445A may correspond with screen buttons 155A-B as illustrated in FIG. 1F in which the operator of the non-pocket-sized portable computing device 100B may select. If the operator selected the "NO" button 155B of FIG. 1F (scenario not illustrated in FIG. 4B), which means that the operator does not wish to continue with the information transfer, then the secure data widget/manager 44 would delete the information contained within fields 120 of FIG. 1F. In alternate exemplary embodiments, this block 445A requiring authorization or may be skipped and not practiced.

In block 450A, which flows from the condition when the "YES" button 155A is selected as illustrated in FIG. 1F., if any payment data was provided in a token format, then the secure data widget/manager 44 will transfer the payment tokens to one or more other servers such as a payment server. Payment data received from the secure data server 50 may be transferred in a token format in which only authorized payment servers have the encryption key to decrypt the token. The process then returns to block 320 of FIG. 3.

If the inquiry to optional decision block 432 is the second data transfer format, then the second data transfer format "II" branch is followed to block 435B in which a message is generated by the secure data server 50 which lists the fields of data which are going to be transferred to the Web server 22. Next, in block 440B, the authorization request message may be displayed on a display device. This block 440B generally corresponds with FIG. 1E illustrating a screen display 208 of a pocket-sized portable computing device 100A that includes a prompt for the operator to authorize the fields of data which may be transferred from the secure data server 50 to the Web server 22.

Subsequently, in block 445B, the secure data server 50 may receive authorization for the data transfer when the operator of the pocket-sized portable computing device 100A selects the "YES" button as illustrated in FIG. 1E. In block 450B, if payment data is being transferred from the secure data server 50, then this payment data may be transferred to the secure data widget/manager 44 in a token format. Any non-payment data may also be transferred to the secure data widget/manager 44 as set forth in block 455B. Next, in block 460B, the secure data widget/manager 44 may transferred the payment data in a token format to a payment server and/or other servers as appropriate. The process then returns to block 320 of FIG. 3.

If the inquiry to optional decision block 432 is the third data transfer format, then the third data transfer format "III" branch is followed to block 450C. In block 450C, if payment data is being transferred from the secure data server 50 to the Web server 22, then this data may be transferred in a token format to the secure data widget/manager 44. In block 455C, the secure data server 50 may also transfer any non-payment data to the secure data widget/manager 44. Next, in block 460C, the secure data widget/manager 44 may transfer any payment data which was received in a token format to a payment server and/or other servers. This third data transfer format "III" branch does not have any steps which require authorization from the operator of the pocket-sized PCD 100A to transfer the data from the secure data server 50 to the Web server 22. The process then returns to block 320 of FIG. 3.

The benefits of the inventive system 101 include, but are not limited to: The operator of a pocket-sized PCD 100A, typically a smart phone, does not need to fill out web forms presented on non-pocket-sized PCDs 100B which translates into time savings because of the elimination of keyed-in information by the operator. With the pocket-sized PCD 100A, multi-factor authentication has been achieved through the use of (1) username/password/PIN for the pocket-sized PCD 100A, (2) and an out-of-band (OOB) messaging with a fingerprinted pocket-sized PCD 100A.

Also, front-end integration for web sessions that utilize the secure data widget/manager 44 may be minimal Is some exemplary embodiments, computer code for web sessions may reference or make calls into the secure data widget/manager 44 with very few lines of code. According to one exemplary embodiment, the computer code for calling the secure data widget/manager may comprise the following four lines of JAVA computer code:

```
// Insert the JavaScript widget
<script type="application/javascript"src="javascript/WID-GETNAME.js"></script>
// Insert a DIV container to insert the widget in an HTML page
<div id="WIDGETNAME"/>
```

This inventive system 101 and method are intended to securely transfer any type of data, such as, but not limited to, shopping cart payment data; sports sign-up form data; health records data; multiple credit card data; and other similar personal and/or confidential information. The system 101 and method are not limited to on-line payments and they may cover the transfer of any sensitive information from the operator of a pocket-sized PCD 100A to an on-line e-commerce system running on a non-pocket-sized PCD 100B.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments for the process 900 and system 101 for managing transactions with the PCD 100 will become apparent to one of ordinary skill in the art to which the invention pertains without departing from its spirit and scope. For example, the PCD 100 may be used for making purchases in an on-line transaction environment. In such environments, the on-line merchant may provide the merchant identifier and/or terminal identifier on the merchant's website/webpages which may be scanned-in by the PCD 100 or keyed-in by the operator of the PCD 100. The contents of the merchant's on-line shopping cart may then be displayed on the PCD 100 similar to the brick and mortar POS transactions described above. The operator of the PCD 100 may also select preferred payment methods also like the brick and mortar POS transactions described above.

According to another exemplary embodiment, instead of the central mobile payment sending data to the PCD 100 to form payment screens of FIGS. 2F-2H and FIGS. 10B-10D, this data may be sent to the ECR 412 or POS terminal (PIN PAD/Card Swiper) for display. In this way, the PCD 100 is only used to authenticate a user so that all payment screens are display and rendered on the Merchant side of the system 101.

Therefore, although selected aspects have been illustrated and described in detail, it will be understood that various substitutions and alterations may be made therein without departing from the spirit and scope of the present invention, as defined by the following claims.

What is claimed is:

1. A method for the secure transfer of information to a web session comprising:
   displaying a prompt to input information in an e-commerce session;
   receiving a selection for completing the e-commerce session by an information transfer;
   generating a machine-readable code that captures data corresponding to the e-commerce session;
   making the machine-readable code available for a machine scan;
   receiving a message derived from the machine-readable code over a computer network; and
   in response to receiving the message derived from the machine-readable code, transferring information from a secure server to the e-commerce session.

2. The method of claim 1, wherein the machine-readable code encapsulates a web-session identifier and the message derived from the machine-readable code comprises the web-session identifier.

3. The method of claim 1, wherein the machine-readable code comprises one of a bar code and a wireless communication.

4. The method of claim 1, wherein the machine-readable code comprises a bar code, the bar code comprises at least one of a one-dimensional bar code and two-dimensional bar code.

5. The method of claim 1, wherein the machine-readable code is produced by a first computing device, and wherein the message is produced from a second computing device scanning the machine-readable code.

6. The method of claim 5, wherein the first computing device comprises a non-pocket-sized computing device.

7. The method of claim 5, wherein the second computing device comprises a pocket-sized portable computing device.

8. The method of claim 7, wherein the pocket-sized portable computing device comprises at least one of a cellular telephone, a pager, a PDA, a smartphone, a navigation device, and a hand-held, palm-sized computer with a wireless connection or link.

9. The method of claim 1, further comprising auto-populating one or more fields of the e-commerce session with the information transferred from the secure server.

10. The method of claim 1, further comprising generating a message that requests authorization before information is transferred from the secure server in response to the message.

11. A computer system for the secure transfer of information to a web session comprising:
a processor operable for:
displaying a prompt to input information in an e-commerce session;
receiving a selection for completing the e-commerce session by an information transfer;
generating a machine-readable code that captures data corresponding to the e-commerce session;
making the machine-readable code available for a machine scan;
receiving a message derived from the machine-readable code over a computer network; and
transferring information from a secure server to the e-commerce session in response to receiving the message derived from the machine-readable code.

12. The system of claim 11, wherein the machine-readable code encapsulates a web-session identifier and the message derived from the machine-readable code comprises the web-session identifier.

13. The system of claim 11, wherein the machine-readable code comprises one of a bar code and a wireless communication.

14. The system of claim 11, wherein the machine-readable code comprises a bar code, the bar code comprises at least one of a one-dimensional bar code and two-dimensional bar code.

15. The system of claim 11, wherein the machine-readable code is produced by a first computing device, and wherein the message is produced from a second computing device scanning the machine-readable code.

16. The system of claim 15, wherein the first computing device comprises a non-pocket-sized computing device.

17. The system of claim 15, wherein the second computing device comprises a pocket-sized portable computing device.

18. The system of claim 17, wherein the pocket-sized portable computing device comprises at least one of a cellular telephone, a pager, a PDA, a smartphone, a navigation device, and a hand-held, palm-sized computer with a wireless connection or link.

19. The system of claim 11, wherein the processor is further operable for auto-populating one or more fields of the e-commerce session with the information transferred from the secure server.

20. The system of claim 11, wherein the processor is further operable for generating a message that requests authorization before information is transferred from the secure server in response to the message.

21. A computer system for the secure transfer of information to a web session, the system comprising:
means for displaying a prompt to input information in an e-commerce session;
means for receiving a selection for completing the e-commerce session by an information transfer;
means for generating a machine-readable code that captures data corresponding to the e-commerce session;
means for making the machine-readable code available for a machine scan;
means for receiving a message derived from the machine-readable code over a computer network; and
means for transferring information from a secure server to the e-commerce session in response to receiving the message derived from the machine-readable code.

22. The system of claim 21, wherein the machine-readable code encapsulates a web-session identifier and the message derived from the machine-readable code comprises the web-session identifier.

23. The system of claim 21, wherein the machine-readable code comprises one of a bar code and a wireless communication.

24. The system of claim 21, wherein the machine-readable code comprises a bar code, the bar code comprises at least one of a one-dimensional bar code and two-dimensional bar code.

25. The system of claim 21, wherein the machine-readable code is produced by a first computing device, and wherein the message is produced from a second computing device scanning the machine-readable code.

26. The method of claim 25, wherein the first computing device comprises a non-pocket-sized computing device.

27. The system of claim 25, wherein the second computing device comprises a pocket-sized portable computing device.

28. The system of claim 27, wherein the pocket-sized portable computing device comprises at least one of a cellular telephone, a pager, a PDA, a smartphone, a navigation device, and a hand-held, palm-sized computer with a wireless connection or link.

29. The system of claim 21, further comprising means for auto-populating one or more fields of the e-commerce session with the information transferred from the secure server.

30. The system of claim 21, further comprising means for generating a message that requests authorization before information is transferred from the secure server in response to the message.

31. A non-transitory computer program product comprising a computer usable medium having a computer readable program code embodied therein, said computer readable program code adapted to be executed to implement a method for the secure transfer of information to a web session, said method comprising:
displaying a prompt to input information in an e-commerce session;
receiving a selection for completing the e-commerce session by an information transfer;
generating a machine-readable code that captures data corresponding to the e-commerce session;
making the machine-readable code available for a machine scan;
receiving a message derived from the machine-readable code over a computer network; and
in response to receiving the message derived from the machine-readable code, transferring information from a secure server to the e-commerce session.

32. The non-transitory computer program product of claim 31, wherein the machine-readable code encapsulates a web-session identifier and the message derived from the machine-readable code comprises the web-session identifier.

33. The non-transitory computer program product of claim 31, wherein the machine-readable code comprises one of a bar code and a wireless communication.

34. The non-transitory computer program product of claim 31, wherein the machine-readable code comprises a bar code, the bar code comprises at least one of a one-dimensional bar code and two-dimensional bar code.

35. The non-transitory computer program product of claim 31, wherein the message is produced from a second computing device scanning the machine-readable code.

36. The non-transitory computer program product of claim 35, wherein the first computing device comprises a non-pocket-sized computing device.

37. The non-transitory computer program product of claim 35, wherein the machine-readable code is produced by a first computing device, and wherein the message is produced from a second computing device scanning the machine-readable code.

38. The non-transitory computer program product of claim 37, wherein the pocket-sized portable computing device comprises at least one of a cellular telephone, a pager, a PDA, a smartphone, a navigation device, and a hand-held, palm-sized computer with a wireless connection or link.

39. The non-transitory computer program product of claim 31, wherein the program code implementing the method further comprises: auto-populating one or more fields of the e-commerce session with the information transferred from the secure server.

40. The non-transitory computer program product of claim 31, wherein the program code implementing the method further comprises: generating a message that requests authorization before information is transferred from the secure server in response to the message.

* * * * *